(12) United States Patent
Taylor

(10) Patent No.: US 9,380,899 B2
(45) Date of Patent: Jul. 5, 2016

(54) BEVERAGE LID SYSTEM, BEVERAGE LID AND ASSOCIATED METHODS

(71) Applicant: Bradley Taylor, Melbourne, FL (US)

(72) Inventor: Bradley Taylor, Melbourne, FL (US)

(73) Assignee: Bradley Taylor, Melbourne, FL (US)

( * ) Notice: Subject to any disclaimer, the term of this patent is extended or adjusted under 35 U.S.C. 154(b) by 36 days.

(21) Appl. No.: 14/212,709

(22) Filed: Mar. 14, 2014

(65) Prior Publication Data

US 2015/0164253 A1    Jun. 18, 2015

Related U.S. Application Data

(60) Provisional application No. 61/915,828, filed on Dec. 13, 2013.

(51) Int. Cl.
```
B01F 7/16      (2006.01)
B01F 15/00     (2006.01)
A47G 19/22     (2006.01)
A47J 43/042    (2006.01)
```

(52) U.S. Cl.
CPC ...... *A47G 19/2272* (2013.01); *B01F 15/00792* (2013.01); *A47J 43/042* (2013.01); *B01F 7/16* (2013.01); *Y10T 29/49826* (2015.01)

(58) Field of Classification Search
CPC ............ B01F 7/16; B01F 15/00681; B01F 15/00792; B01F 13/002; B01F 7/00008; B01F 7/00108; B01F 13/0022; A47G 19/2205; A47G 19/2272; B65D 51/32; B65D 51/24; B65D 51/246; B65D 2101/0023; A47J 41/0088; A47J 43/1018; A47J 43/1075; A47J 43/27; A47J 43/042

USPC ............ 220/212, 212.5, 735, 912; 366/248, 366/241, 244

See application file for complete search history.

(56) References Cited

U.S. PATENT DOCUMENTS

| | | | | |
|---|---|---|---|---|
| 1,095,517 A | * | 5/1914 | Parshall | B01F 15/068 165/135 |
| 2,736,536 A | * | 2/1956 | Banowitz | 366/248 |
| 2,918,203 A | * | 12/1959 | Hodgson | 229/401 |
| 4,854,718 A | * | 8/1989 | Wang | A47J 43/1025 366/252 |

(Continued)

FOREIGN PATENT DOCUMENTS

EP    2 198 762 B1    8/2011

OTHER PUBLICATIONS

United States Patent and Trademark Office's Final Office Action dated Dec. 4, 2015 for U.S. Appl. No. 14/212,709 (10 pages).

(Continued)

*Primary Examiner* — J. Gregory Pickett
*Assistant Examiner* — Gideon Weinerth
(74) *Attorney, Agent, or Firm* — Mark Malek; Kelly Swartz; Widerman Malek, PL

(57) ABSTRACT

A beverage lid system may include a beverage lid and a stirrer that may be connected to a portion of the beverage lid. The beverage lid may include an outer lid member, a medial lid member rotatably carried by an interior portion of the outer lid member, and an inner lid member rotatably carried by an interior portion of the medial lid member. The stirrer may be adapted to be connected to a portion of the medial lid member. The medial lid member is rotatable with respect to both the outer lid member and the inner lid member so that when the stirrer is connected to the medial lid member, the stirrer is moveable with the medial lid member.

14 Claims, 3 Drawing Sheets

(56) References Cited

U.S. PATENT DOCUMENTS

| | | | |
|---|---|---|---|
| 4,946,286 A * | 8/1990 | Purkapile | 366/247 |
| 5,251,774 A * | 10/1993 | Engle | 220/212 |
| 5,392,949 A * | 2/1995 | McKenna | 220/712 |
| 5,407,270 A * | 4/1995 | Barile et al. | 366/247 |
| 5,586,676 A * | 12/1996 | Lynd | 220/212 |
| 6,224,253 B1 * | 5/2001 | Dixon | A47J 43/27 366/247 |
| 6,871,995 B2 * | 3/2005 | Simba | 366/129 |
| 6,877,891 B2 * | 4/2005 | Hu | 366/247 |
| 7,946,752 B2 * | 5/2011 | Swartz et al. | 366/247 |
| 8,092,072 B2 * | 1/2012 | Parias Cruz | 366/129 |
| 8,322,562 B2 | 12/2012 | Dybala | |
| 8,387,795 B1 | 3/2013 | Rogers et al. | |
| D701,727 S * | 4/2014 | Gilbert | D7/300.1 |
| 8,794,822 B2 * | 8/2014 | Serra | 366/347 |
| 2005/0105388 A1 * | 5/2005 | Fischman | B01F 7/1695 366/247 |
| 2007/0056447 A1 * | 3/2007 | Swartz | A47G 19/2205 99/287 |
| 2009/0147615 A1 * | 6/2009 | Parias Cruz | A47J 43/1018 366/130 |
| 2009/0277902 A1 * | 11/2009 | Darflinger | B65D 51/246 220/212 |
| 2010/0065566 A1 * | 3/2010 | Bacon | B65D 51/32 220/212 |
| 2010/0208549 A1 * | 8/2010 | Kitson | A47J 27/21175 366/247 |
| 2010/0302897 A1 * | 12/2010 | George | A47J 43/1025 366/130 |
| 2011/0247435 A1 * | 10/2011 | Brinker | B01F 7/161 73/864.01 |
| 2012/0269025 A1 * | 10/2012 | Liu | A47J 43/18 366/129 |
| 2013/0010568 A1 * | 1/2013 | Bodum | A47J 31/00 366/130 |

OTHER PUBLICATIONS

United States Patent and Trademark Office's Non-Final Office Action dated Dec. 4, 2015 for related U.S. Appl. No. 14/619,641 (14 pages).

United States Patent and Trademark Office's Non-Final Office Action dated Jun. 19, 2015 for U.S. Appl. No. 14/212,709 (8 pages).

* cited by examiner

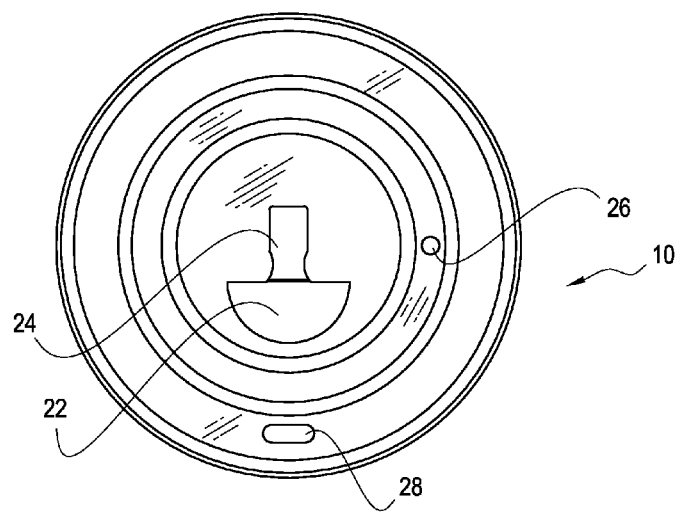
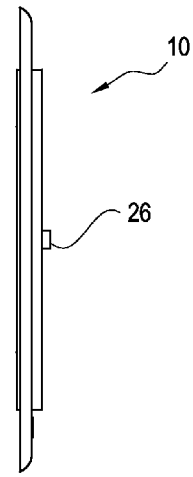
Fig. 4     Fig. 5
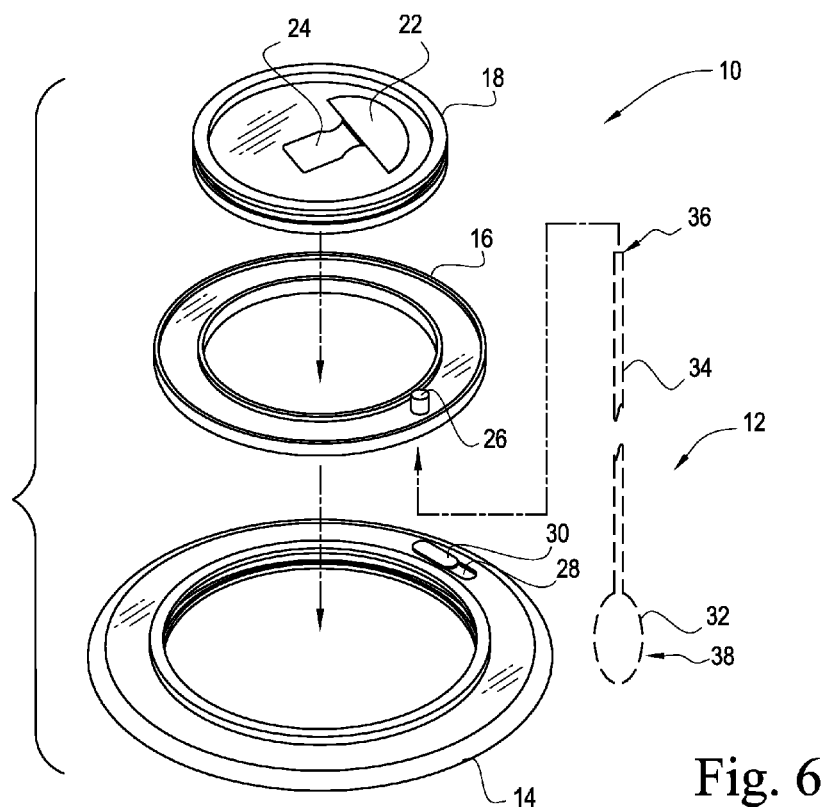
Fig. 6

BEVERAGE LID SYSTEM, BEVERAGE LID AND ASSOCIATED METHODS

RELATED APPLICATIONS

This application claims the benefit under 35 U.S.C. §119 (e) of U.S. Provisional Patent Application Ser. No. 61/915, 828 titled Beverage Lid Having Integral Stirrer, filed on Dec. 13, 2013, the entire contents of which are incorporated herein by reference.

FIELD OF THE INVENTION

The present invention relates to beverage lids and, more specifically, to lids to be used with beverages that have integral stirrers.

BACKGROUND

Beverage lids for disposable beverage containers have been used in the past to prevent a beverage from being spilled outside of the beverage container. This is especially advantageous for travelers that may desire to drink a beverage in a vehicle, for example. Traditional beverage lids, however, can be cumbersome to handle when used in connection with beverages that may require condiments to be added thereto. For example, when the beverage lid is positioned to cover a cup of coffee, a consumer that has received the cup of coffee may desire to add, for example, milk, creamer, sugar, or sweetener to the coffee. In order to accomplish this, however, the beverage lid must be removed, the condiment of the deposited into the cup and be stirred, and the beverage lid must thereafter be replaced over the cup. Upon completing this process, the consumer must then dispose of the stirrer. This can be a difficult process to manage, especially when in a vehicle. Further, disposal of the stirrer is not a simple task in a vehicle. For example, the stirrer may find its way to the floor board of the vehicle or, even worse, the consumer may simply decide to litter.

Adding sugar to a beverage and stirring the sugar into the beverage is not always a very fast process. For example, the sugar may not initially dissolved into the beverage that is added. In such a case, it is desirous to continuously stir the beverage. When using, however, a traditional beverage lid, this would require continuous removal of the beverage lid in order to stir the beverage.

Such a typical beverage lid is illustrated, for example, in U.S. Pat. No. 8,322,562 to Dybala. Such a lid may be positioned over a beverage container to prevent a beverage held within the container from being spilled out. The beverage lid illustrated in the Dybala '562 patent includes a drinking opening to allow a consumer to sip the beverage. The Dybala beverage lid, however, must be removed in order to add anything to the beverage contained within the beverage container, and to also stir that which is been added to the beverage.

There have been some devices introduced to block the drinking opening formed in a beverage lid. For example, U.S. Pat. No. 8,387,795 to Rogers, et al. discloses a combined beverage lid plug and book mark. After a consumer is done using the bookmark, the consumer may use the bookmark to block the opening in a beverage lid. This may be advantageous to prevent any of the beverage contained within the beverage container from being spilled outwardly through the drinking opening. The Rogers lid, however, still must be removed in order for a consumer to add any type of condiments to a beverage.

There have been some beverage lids for beverage containers that are not intended to be disposable that may include an electrically powered stirrer connected thereto. For example, European Patent No. EP 2 198 762 discloses a hot beverage making apparatus that include lid that has a motorized stirrer connected to a bottom portion thereof. This may be used to stir hot beverages, for example, cappuccino and other milk hot beverages.

Accordingly, there exists a need to provide a beverage lid that allows a user to add condiments to a beverage and to stir the condiments after being added without the need to remove the lid from the beverage container. This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, it is therefore an object of the present invention to provide a beverage lid that allows a consumer the ability to add a condiment to a beverage contained the beverage container without the need to remove the beverage lid from the beverage container. It is further an object of the present invention to provide a beverage lid system that allows a consumer to stir the beverage contained within the beverage container while the beverage lid remains fastened to the beverage container.

These and other objects, features and objectives of the present invention are provided by a beverage lid system that comprises a beverage lid and a stirrer. The beverage lid may include an outer lid member, a medial lid member rotatably carried by an interior portion of the outer lid member, and an inner lid member rotatably carried by an interior portion of the medial lid member. The stirrer may be adapted to be connected to a portion of the medial lid member. The medial lid member may be rotatable with respect to both the outer lid member and the inner lid member so that when the stirrer is connected to the medial lid member, the stirrer is moveable with the medial lid member.

The medial lid member may include a stirrer handle that extends upwardly from a top portion of the medial lid member. The stirrer handle may be adapted to receive the stirrer. Further, the stirrer handle may include a top, sidewalls extending downwardly from the top and connected to the top portion of the medial lid member, and extending therethrough, and an open bottom. An end portion of the stirrer may matingly engage the open bottom of the stirrer handle. The inner lid member may include a top opening formed through a top portion thereof. The beverage lid further comprises a top opening cover connected to the top portion of the inner lid member and adapted to be moved between an opened position and a closed position. The closed position is defined as the top opening cover being positioned over the top opening and engaging the top portion of the inner lid member. The opened position is defined as the top opening cover being disengaged from the top portion of the inner lid member.

The beverage lid may further comprise a tether member having a first end connected to the top portion of the inner lid member, and a second end connected to the top opening cover. The outer lid member may also include a drinking opening formed through the top portion thereof. A drinking opening cover may movably engage the top portion of the outer lid member. The drinking opening cover may be moveable between an opened position and a closed position. The opened position may be defined as the drinking opening being exposed, and the closed position may be defined as the drinking opening cover covering the drinking opening.

In another embodiment of the beverage lid system, the beverage lid may include a first seal member positioned between an outer peripheral portion of the inner lid member and an inner peripheral portion of the medial lid member, and a second seal member positioned between an outer peripheral portion of the medial lid member and an inner peripheral portion of the outer lid member.

A method aspect of the present invention is for using a beverage lid system. The method may include connecting the stirrer to a portion of the medial lid member so that when the stirrer is connected to the medial lid member, the stirrer is movable with the medial lid member.

BRIEF DESCRIPTION OF THE DRAWINGS

FIG. 4 is a bottom plan view of the beverage lid illustrated in FIG. S.

FIG. 5 is a side elevation view of the beverage lid illustrated in FIG. 4 and having the stirrer removed therefrom.

FIG. 6 is an exploded perspective view of the beverage lid illustrated in FIG. 1.

DETAILED DESCRIPTION OF THE INVENTION

Figure 1:
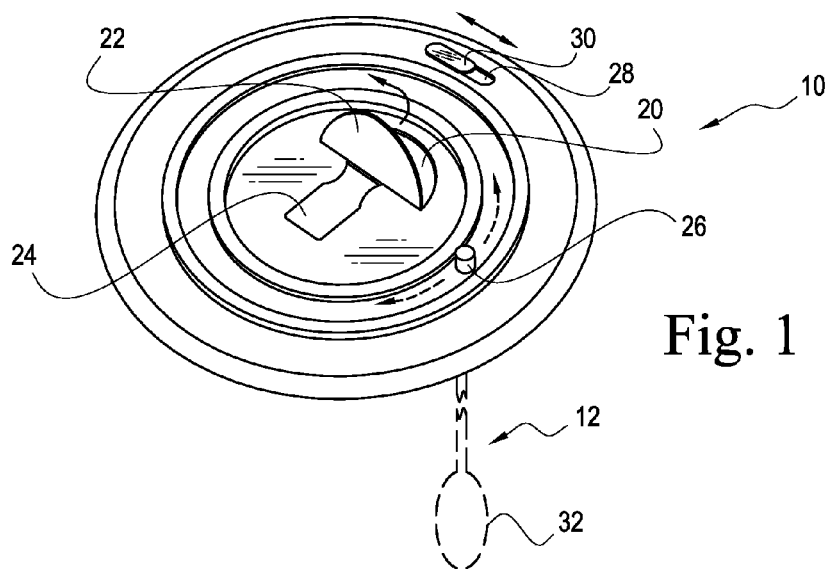
FIG. 1 is a perspective view of a beverage lid having an integral stirrer according to an embodiment of the present invention having portions cutaway.
Figure 2:
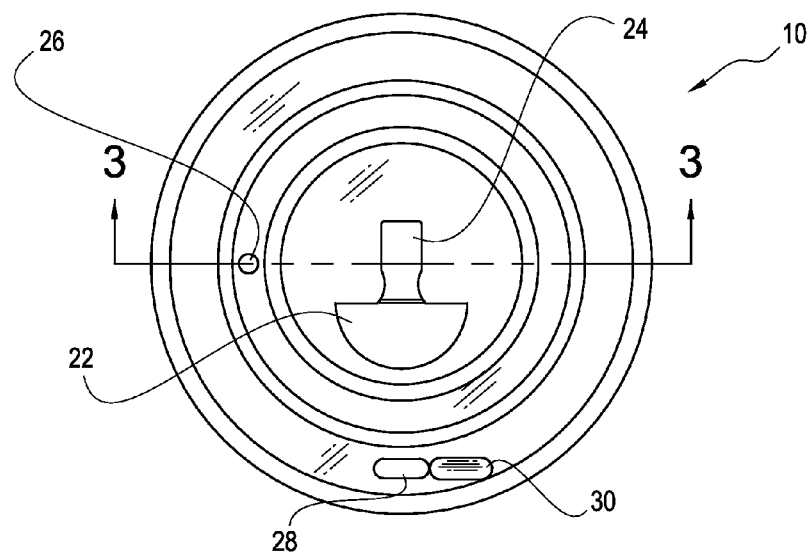
FIG. 2 is a top plan view of the beverage lid illustrated in FIG. 1.
Figure 3:
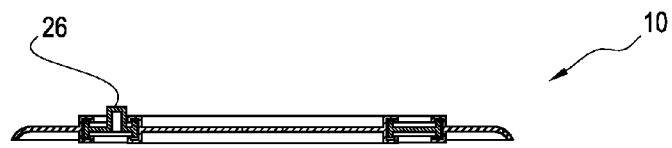
FIG. 3 is a cross sectional view of the beverage lid illustrated in FIG. 2 and taken through line 3-3.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring now to FIGS. 1-6, embodiments of a beverage lid 10 according to the present invention are now described. As perhaps best illustrated in FIGS. 1 and 6, the beverage lid 10 according to the present invention preferably includes an integrated stirrer 12 so that a user may advantageously add condiments to a beverage, such as, for example, creamer for coffee, or a sweetener, through a passageway formed in a top portion of the beverage lid (as will be discussed in greater detail below) and stir the condiment using the integrated stirrer. This advantageously allows for condiments to be added to a beverage without the need to remove the beverage lid from a cup.

The beverage lid 10 of the present invention illustratively has a substantially circular shape to accommodate the shape of traditional beverage holders, i.e. cups. Those skilled in the art, however, will appreciate that the beverage lid 10 according to the present invention may advantageously be provided having any shape while still accomplishing the goals, features and objectives of the present invention. More particularly, it is contemplated that the beverage lid 10 may, for example, have a square shape, a rectangle shape, and an ovular shape, a polygonal shape, or any shape suitable to accommodate any cup upon which it may be positioned.

Referring now to FIG. 6, additional features of the beverage lid 10 according to embodiments of the present invention are now described in greater detail. More specifically, the beverage lid 10 may include an outer lid member 14, a medial lid member 16, and an inner lid member 18. Further, the outer lid member 14, medial lid member 16, and inner lid member 18 are preferably rotatably connected to one another. In other words, the medial lid member 16 is rotatably carried by the outer lid member 14. Likewise, the inner lid member 18 may be rotatably carried by the medial lid member 16. This advantageously allows for the medial lid member 16 to rotate with respect to the outer lid member 14, and the inner lid member 18 to rotate with respect to the medial lid member. As will be discussed in greater detail below, the rotatable connection between the inner lid member 18 and the medial lid member 16 is optional, and the goals features and objectives of the beverage lid 10 according to the present invention may still be carried out should the connection between the inner lid member 18 and the medial lid member 16 is not rotatable, or even if the inner lid member and the medial lid member are integrally formed as a monolithic unit.

The outer lid member 14 illustratively includes a medially positioned opening adapted to receive the medial lid member 16. More specifically, an interior portion of the outer lid member 14 includes a track. The track may be adapted to receive sidewalls of the medial lid member 16. The outer lid member 14 is characterized by a top, sidewalls extending downwardly therefrom, and a bottom. More particularly, the outer lid member 14 also includes a cup engaging track along the bottom that is adapted to engage the top portion of a cup so that the beverage lid 10 according to the present invention may be fixedly connected to a top portion of a cup. The outer lid member 14 also illustratively includes a drinking opening 28 formed through the top portion thereof. The drinking opening 28 may, for example, be a passageway that is formed through the outer lid member 14 so that a beverage within a cup may be accessed by a user when the beverage lid 10 is fixedly connected to the top of the cup. The drinking opening 28 is illustrated as having an ovular shape. Those skilled in the art will appreciate, however, that the drinking opening 28 may have any shape while still carrying out the goals, features and objectives according to the present invention.

As perhaps best illustrated in FIG. 1, the outer lid member 14 may also include a drinking opening cover 30 that is adapted to be moved between a closed position and an opened position. The closed position is defined as the drinking opening cover 30 completely, or nearly completely, covering the drinking opening 28 formed through the top portion of the outer lid member 14. The opened position is defined as the drinking opening cover 30 being positioned so that the drinking opening 28 is exposed to allow a user to extract beverage from the cup that the beverage lid is connected to. In other words, when the drinking opening cover 30 is in the open position, the drinking opening 28 allows for the passageway to be formed through the outer lid member 14, whereas when the drinking opening cover 30 is in the closed position, no passageway is provided through the outer lid member.

The drinking opening cover 30 is illustrated as slidably engaging the drinking opening 28 formed in the outer lid member 14. Those skilled in the art, however, will appreciate that many other configurations may be provided for the drinking opening cover 30. For example, the drinking opening cover 30 may be removably connected to the drinking opening 28 of the outer lid member so that a user may simply remove and discard the drinking opening cover 30 allowing for the passageway of the drinking opening to remain open. Those skilled in the art will further appreciate that the drinking opening cover 30 is merely an optional feature of the present invention, and that the beverage lid 10 according to the present invention contemplates embodiments that do not include a drinking opening cover. Further, the drinking opening cover 30 of the outer lid member 14 is illustrated as having a shape that is ovular, i.e., similar to the shape of the drinking opening 28 that is illustrated. Those skilled in the art will appreciate that, similar to the drinking opening 28, the drinking opening cover 30 may also have any shape, but that the shape of the drinking opening cover 30 is preferably similar to the shape of the drinking opening 28.

The medial lid member 16 of the beverage lid 10 according to the embodiments of the present invention will now be described in greater detail. As illustrated in FIG. 6, the medial lid member 16 rotatably engages the opening formed in the outer lid member 14. More specifically, the medial lid member 16 includes a top and a bottom, and sidewalls extending therebetween. The sidewalls of the medial lid member 16 may engage a track portion formed on an interior peripheral portion of the opening formed in the outer lid member 14. Accordingly, the track portion formed on the interior peripheral portion of the outer lid member 14 may have a height that is larger than the height of the sidewalls on an outer peripheral portion of the medial lid member 16 so that the medial lid member may rotate with respect to the outer lid member.

As also illustrated in FIG. 6, a stirrer handle 26 may connect to and protrude upwardly from a top portion of the medial lid member. The stirrer handle 26 may be a cylindrically shaped member that protrudes upwardly from the top of the medial lid member 14, and may be hollow. In other words, an interior portion of the stirrer handle 26 may be open. As will be discussed in greater detail below, the interior portion of the stirrer handle 26 is adapted to receive a portion of the stirrer 12. The illustrated stirrer handle 26 includes a top and sidewalls extending downwardly therefrom. The sidewalls are connected to the top portion of the medial lid member 16 and, in some embodiments extends therethrough so that an open bottom of the stirrer handle 26 is exposed when viewing the beverage lid 10 from the bottom, i.e., as illustrated in FIG. 4.

The beverage lid 10 according to embodiments of the present invention may also include a stirrer 12. The stirrer 12 is adapted to engage the stirrer handle 26. More particularly, the stirrer 12 is elongate, and has a first end 36 that matingly engages the open bottom portion of the stirrer handle 26. The stirrer 12 also includes a main body 34 that extends downwardly from the first end 36, and a second end 38 opposite the first end. The second end 38 of the stirrer 12 includes a stirring member 32 that is adapted to move (agitate or stir) a beverage being held in a cup when the medial lid member 16 is rotated with respect to the outer lid member 14. Accordingly, the user may grasp the stirrer handle 26 when the medial lid member 16 is connected to the outer lid member 14, and rotate in the medial lid member in any direction. Such rotation will cause the stirrer member 12 that is connected to the stirrer handle 26 to also rotate and agitate, or stir, the beverage being held in the cup that the beverage lid 10 according to the present invention is connected to.

The stirrer 12 of the beverage lid 10 according to embodiments of the present invention is illustrated as a spoon. Those skilled in the art, however, will appreciate that the stirrer 12 may take on any shape. For example, the stirrer 12 may be in the shape of a traditional coffee stirrer. Further, the second end 38 of the stirrer 12, although illustrated as being a spoon having an ovular shape, may have any shape, i.e., rectangular, square, etc.

The beverage lid 10 according to embodiments of the present invention also includes an inner lid member 18. The inner lid member 18 is adapted to be carried by the medial lid member 16. In some embodiments, the inner lid member 18 may be rotatably carried by the medial lid member 16. More specifically, an interior peripheral sidewall portion of the medial lid member 16 may engage a track portion of the inner lid member 18. Therefore, it should be appreciated by those skilled in the art that the inner lid member 18 can be rotated with respect to the medial lid member 16. Those skilled in the art will also appreciate that in some embodiments of the present invention, the inner lid member 18 and the medial lid member 16 may be integrally formed as a monolithic unit so that rotation of the medial lid member with respect to the outer lid member 14 also causes rotation of the inner lid member 18.

The inner lid member 18 may include a top opening 20 which is perhaps best illustrated in FIG. 1. The top opening 20 advantageously allows a user to deposit condiments into a beverage while the beverage lid 10 is connected to the cup. For example, and using coffee for illustrative purposes only, if the beverage lid 10 is positioned on a cup of coffee, a user may deposit cream, milk, sweetener, or any other condiment into their coffee without removing the beverage lid through the top opening 20. The beverage lid 10 may also include a top opening cover 22. The top opening cover 22 is shaped to substantially cover the top opening 20 formed through the inner lid member 18. Further, the top opening cover 22 may be connected to the inner lid member 18 using a tether member 24. Accordingly, the top opening cover 22 may be removed from the top opening 20 but still connected to the inner lid member 18 by the tether member 24. Further, the connection between the tether member 24 and the top opening cover 22 may include a seam. This connection between the tether member 24 and the top opening cover 22 advantageously allows the top opening cover to be folded back so that a portion of the top opening cover remains in contact with a portion of the top opening 20 formed in the inner lid member 18. If the user so desires, however, the top opening cover 22 may be fully removed from the top opening 20 but still connected to the inner lid member 18 of the beverage lid 10 by virtue of the connection to the tether member 24.

Figure 7:
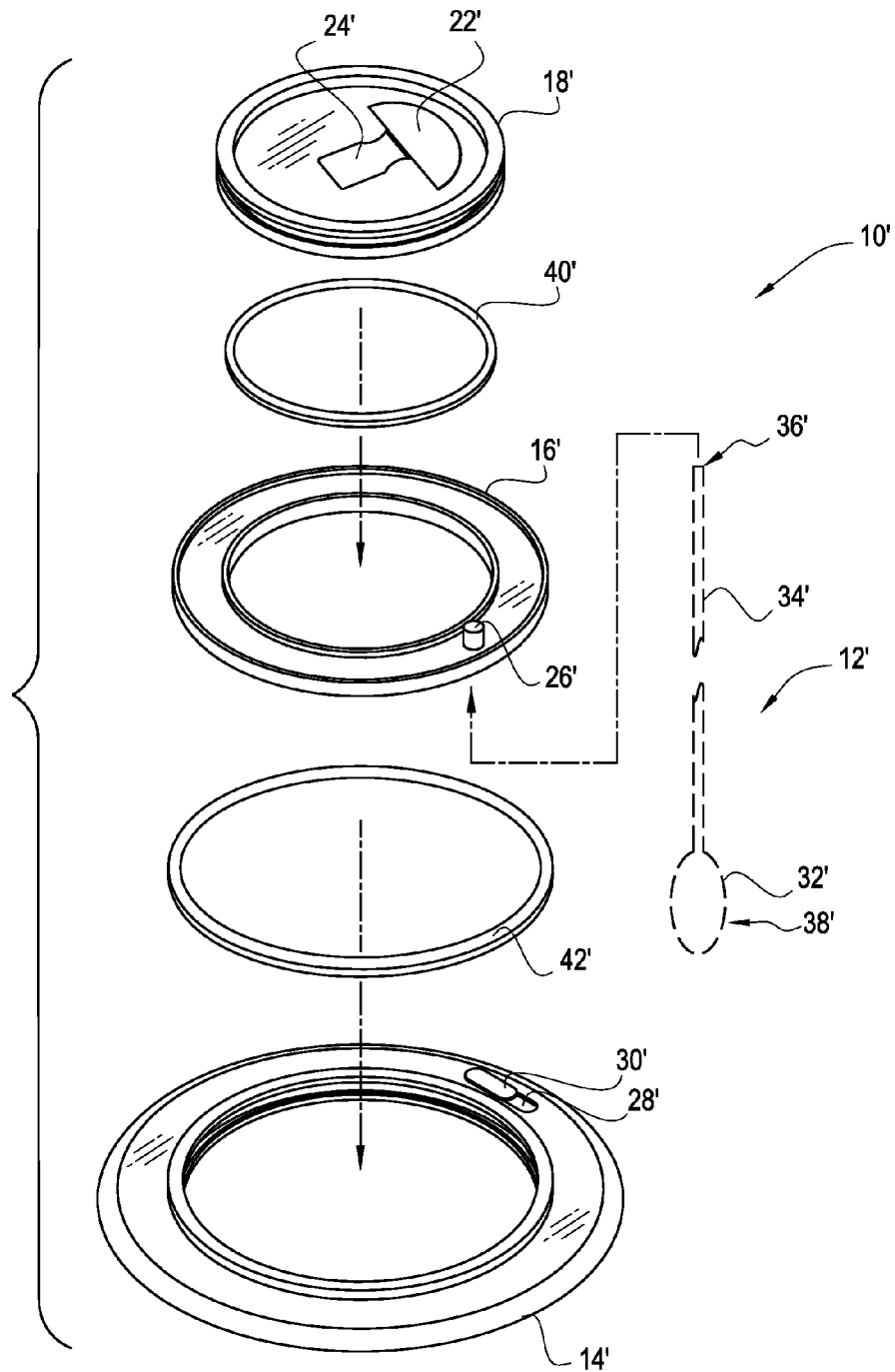
FIG. 7 is an exploded perspective view of another embodiment of a beverage lid according to the present invention.

Referring now to FIG. 7, another embodiment of the beverage lid 10' is now described in greater detail. In this embodiment of the beverage lid 10', a plurality of seals are provided. More specifically, a first seal 40' is provided between the inner lid member 18' and the medial lid member 16', and a second seal 42' is provided between the medial lid member 16' and the outer lid member 14'. The first seal 40' may be positioned between an outer peripheral portion of the inner lid member 18' and an inner peripheral portion of the medial lid member 16'. The second seal 42' may be positioned between an outer peripheral portion of the medial lid member 16' and an inner peripheral portion of the outer lid member 14'. Accordingly, the first seal 40' and the second seal 42' may advantageously reduce, or even eliminate, any possibility of a beverage being contained within the beverage container from leaking through a portion of the beverage lid 10'. The other elements of this embodiment of the beverage lid 10' are similar to those on the first embodiment of the beverage lid 10, are labeled with prime notation, and require no further discussion herein.

Operation of the beverage lid 10 according to embodiments of the present invention is now described in greater detail. More specifically, a user may desire to position the beverage lid 10 according to the present invention on a cup that contains a beverage. In storage, the stirrer 12 of the beverage lid may, for ease of storage, be disconnected from the stirrer handle 26 formed on the medial lid member 16. IN other words, the stirrer 12 may be separated from the stirrer handle so that, as described in greater detail below, the beverage lid 10 may be stored in a stacked configuration prior to being connected to a cup. Accordingly, the stirrer 12 may be connected to the stirrer handle 26 prior to connecting the beverage lid 10 to the cup. Upon connecting the beverage lid 10 of the present invention to the cup, the stirrer 12 may extend downwardly into the cup so that the stirrer is in communication with the beverage held within the cup. Thereafter, the user may access the top opening 20 formed in the inner lid member 18 by removing the top opening cover 22. As described above, moving the top opening cover 22 may include simply folding back the top opening cover or completely removing the top opening cover from contact with the top opening 20 so that the top opening cover is held to the inner lid member 18 using the tether member 24. The present invention contemplates that the top opening cover 22 may, in some instances, be completely removed from the inner lid member 18, i.e., that the top opening cover 22 and the tether 24 are disconnected from the inner lid member if so desired by a user.

Upon accessing the top opening 20 formed in the inner lid member 18, the user may add any condiments desired to the beverage by pouring, or depositing, the condiments through the top opening. After depositing the desired condiments into the beverage through the top opening 20, the user may, if desired, choose to close the top opening by positioning the top opening cover 22 over the top opening. Thereafter, the user may grasp the stirrer handle 26 and rotate in any direction to cause the beverage contained within the cup to be stirred, or agitated. This advantageously allows for the condiment that has been deposited into the beverage to be readily mixed with the beverage.

The configuration of the beverage lid 10 according to embodiments of the present invention advantageously eliminates the problem that arises when a user desires to add a condiment to a beverage that already has a lid connected to the cup that is holding the beverage. For example, when a user orders coffee at a drive-through, many times, the coffee is served not to the user's liking. Many times the coffee may require additional cream, milk, or sweetener. In such a case, the user, while sitting in their vehicle, must remove the beverage lid, add whatever condiments may be necessary, attempt to stir the beverage to mix the condiments into the beverage, and again position the beverage lid onto the cup. The beverage lid 10 according to the present invention advantageously eliminates this issue by allowing the user to simply access the top opening 20 formed in the inner lid member 18, add whatever condiments may be necessary, grasp the stirrer handle 26, rotate the stirrer handle to cause rotation of the stirrer 12, thereby allowing the condiments to be mixed with the beverage. In other words, removal of the beverage lid is eliminated by use of beverage lid 10 according to the present invention.

The configuration of the beverage lid 10 according to embodiments of the present invention also advantageously allows for use in retail settings where space may be limited. In other words, the plurality of beverage lids 10 may be advantageously stacked on top of one another and a plurality of stirrers 12 may be positioned in close proximity to the beverage lid 10. Upon ordering of a beverage, a worker in a retail establishment may simply attach the stirrer to a bottom portion of the stirrer handle 26 on the medial lid member 16 before positioning the beverage lid over the cup. Thereafter, the user that receives the beverage having the beverage lid 10 according to the present invention connected thereto can readily add any condiments that may be necessary through the top opening 20 formed in the inner lid member 18 and readily stir the condiment and the beverage using the stirrer 12 without the need to remove the beverage lid from the cup.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A beverage lid system comprising:
   a beverage lid comprising:
      an outer lid member having a top, an outer lid sidewall extending downwardly therefrom, and a bottom attached to the outer lid sidewall, wherein the top, the outer lid sidewall, and the bottom are configured to form a track, having a track height, on an interior portion of the outer lid member;
      a medial lid member having a medial sidewall, with a medial sidewall height smaller than the track height, on an outer peripheral portion of the medial lid member, the medial sidewall adapted to be rotatably carried by the track, and
      an inner lid member rotatably carried by an interior portion of the medial lid member; and
   a stirrer adapted to be connected to a portion of the medial lid member;
   wherein the medial lid member is rotatable with respect to both the outer lid member and the inner lid member so that when the stirrer is connected to the medial lid member, the stirrer is moveable with the medial lid member;
   wherein the medial lid member comprises a stirrer handle integrally formed with the medial lid member that extends upwardly from a top portion of the medial lid member;
   wherein the stirrer handle is adapted to receive the stirrer; and
   wherein the stirrer handle further includes a top, sidewalls extending downwardly from the top and connected to the top portion of the medial lid member, and an open bottom wherein an end portion of the stirrer matingly engages the open bottom of the stirrer handle.

2. The system according to claim 1 wherein the inner lid member includes a top opening formed through a top portion thereof; wherein the beverage lid further comprises a top opening cover connected to the top portion of the inner lid member and adapted to be moved between an opened position and a closed position; wherein the closed position is defined as the top opening cover being positioned over the top opening and engaging the top portion of the inner lid member; and wherein the opened position is defined as the top opening cover being disengaged from the top portion of the inner lid member.

3. The system according to claim 2 wherein the beverage lid further comprises a tether member having a first end connected to the top portion of the inner lid member, and a second end connected to the top opening cover.

4. The system according to claim 1 wherein the outer lid member includes a drinking opening formed through the top portion thereof, and comprising a drinking opening cover that movably engages the top portion of the outer lid member, and is moveable between an opened position and a closed position; wherein the opened position is defined as the drinking opening being exposed; and wherein the closed position is defined as the drinking opening cover covering the drinking opening.

5. The system according to claim 1 wherein the beverage lid further comprises a first seal member positioned between an outer peripheral portion of the inner lid member and an inner peripheral portion of the medial lid member, and a second seal member positioned between an outer peripheral portion of the medial lid member and an inner peripheral portion of the outer lid member.

6. A beverage lid comprising:
   an outer lid member having an outer lid top, an outer lid sidewall extending downwardly therefrom, and an outer lid bottom attached to the outer lid sidewall, wherein the outer lid top, the outer lid sidewall, and the outer lid bottom are configured to form an outer lid interior track, having an outer lid interior track height, on an interior portion of the outer lid member;
   a medial lid member having a medial lid outer peripheral sidewall, with a medial lid outer peripheral sidewall height smaller than the outer lid interior track height, on an outer peripheral portion of the medial lid member, the medial lid outer peripheral sidewall adapted to be rotatably carried by the outer lid interior track, the medial lid member having a medial lid interior peripheral sidewall, with a medial lid interior peripheral sidewall height, the medial lid member having a stirrer handle integrally formed with the medial lid member that extends upwardly from a top portion of the medial lid member; wherein the stirrer handle is adapted to receive a stirrer for connection to a bottom portion thereof; wherein the stirrer handle further includes a top, sidewalls extending downwardly from the top, and an open bottom wherein an end portion of the stirrer matingly engages the open bottom of the stirrer handle; and
   an inner lid member having an inner lid member exterior track with an inner lid member exterior track height larger than the medial lid interior peripheral sidewall height, the inner lid member exterior track being adapted to rotatably carry the medial lid interior peripheral sidewall;
   wherein the medial lid member is rotatable with respect to both the outer lid member and the inner lid member.

7. The beverage lid according to claim 6 wherein the inner lid member includes a top opening formed through a top portion thereof; and further comprising a top opening cover connected to the top portion of the inner lid member and adapted to be moved between an opened position and a closed position; wherein the closed position is defined as the top opening cover being positioned over the top opening and engaging the top portion of the inner lid member; and wherein the opened position is defined as the top opening cover being disengaged from the top portion of the inner lid member.

8. The beverage lid according to claim 7 further comprising a tether member having a first end connected to the top portion of the inner lid member, and a second end connected to the top opening cover.

9. The beverage lid according to claim 6 wherein the outer lid member includes a drinking opening formed through the top portion thereof; and further comprising a drinking opening cover that movably engages the top portion of the outer lid member, and is moveable between an opened position and a closed position; wherein the opened position is defined as the drinking opening being exposed; and wherein the closed position is defined as the drinking opening cover covering the drinking opening.

10. The beverage lid according to claim 6 further comprising a first seal member positioned between an outer peripheral portion of the inner lid member and an inner peripheral portion of the medial lid member, and a second seal member positioned between an outer peripheral portion of the medial lid member and an inner peripheral portion of the outer lid member.

11. A method of using a beverage lid system, the beverage lid system comprising a beverage lid and a stirrer that is connectable to the beverage lid, the beverage lid comprising an outer lid member having a top, an outer lid sidewall extending downwardly therefrom, and a bottom attached to the outer lid sidewall, wherein the top, the outer lid sidewall, and the bottom are configured to form a track having a track height on an interior portion of the outer lid member, a medial lid member having a medial sidewall, with a medial sidewall height smaller than the track height, on an outer peripheral portion of the medial lid member, the medial sidewall adapted to be rotatably carried by the track, the medial lid member comprising a stirrer handle integrally formed with the inner lid member that extends upwardly from a top portion of the medial lid member, wherein the stirrer handle includes a top, sidewalls extending downwardly from the top and connected to the top portion of the medial lid member, and an open bottom, and an inner lid member rotatably carried by the medial lid member, the method comprising:

connecting the stirrer to the open bottom of the stirrer handle so that when the stirrer is connected to the medial lid member, the stirrer is movable with the medial lid member.

12. The method according to claim 11 wherein the inner lid member includes a top opening formed through a top portion thereof; wherein the beverage lid further comprises a top opening cover connected to the top portion of the inner lid member; and further comprising moving the top opening cover between an opened position and a closed position; wherein the closed position is defined as the top opening cover being positioned over the top opening and engaging the top portion of the inner lid member; and wherein the opened position is defined as the top opening cover being disengaged from the top portion of the inner lid member.

13. The method according to claim 11 wherein the outer lid member includes a drinking opening formed through the top portion thereof, and wherein the beverage lid further comprises a drinking opening cover; and further comprising movably engaging the drinking opening cover with the top portion of the outer lid member between an opened position and a closed position; wherein the opened position is defined as the drinking opening being exposed; and wherein the closed position is defined as the drinking opening cover covering the drinking opening.

14. The method according to claim 11 wherein the beverage lid further comprises a first seal member positioned between an outer peripheral portion of the inner lid member and an inner peripheral portion of the medial lid member, and a second seal member positioned between an outer peripheral portion of the medial lid member and an inner peripheral portion of the outer lid member.

* * * * *